3,120,170
COFFEE MAKING DEVICE
Mathew Garte, 667 Madison Ave., New York 21, N.Y.
Filed June 8, 1961, Ser. No. 115,687
6 Claims. (Cl. 99—287)

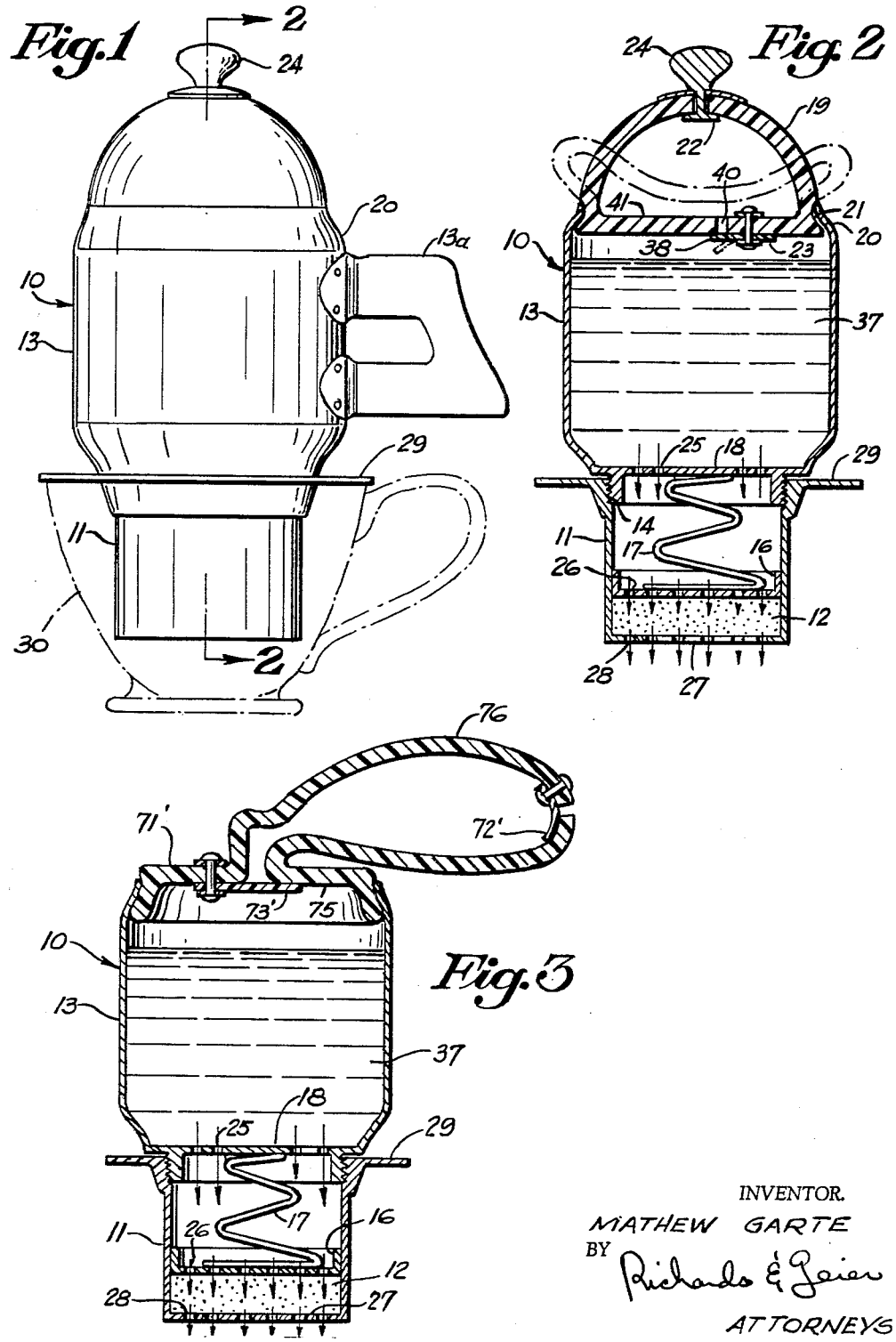

This invention relates to a coffee making device and refers more particularly to a coffee maker which utilizes pneumatic pressure to pump hot water through ground coffee to prepare the coffee beverage by a single passage of the water through the ground coffee.

It is an object of the present invention to provide a coffee maker which in use enables the user to make excellent hot coffee in a few seconds time with a minimum of preparation and effort.

It is another object of the present invention to provide a coffee maker which in use forces hot water through the ground coffee under pressure, thereby causing maximum extraction of flavor giving substance from the ground coffee.

Still another object of the present invention is to provide a coffee maker which uses coffee grounds to make excellently tasting coffee in a shorter time period than is now required to make so-called instant coffee.

A further object of the present invention is to provide a coffee maker which is simple in construction, reliable in operation, and inexpensive to make.

A still further object of the present invention is to provide a coffee maker which is adapted to be supported directly on top of an ordinary drinking cup or other container to allow the hot coffee beverage to be collected directly therein.

Other objects of the present invention will become apparent in the course of the following specification.

In achieving the aforementioned objectives of the present invention it was found advantageous to provide a coffee maker which has a cylindrical brewing chamber in which ground coffee is placed. A second chamber is supported on top of the brewing chamber and is used to hold hot water prior to brewing. A hollow resilient combination pump-cover member is supported on top of the hot water chamber and is pneumatically connected to the hot water chamber so that when the pump member is squeezed an air pressure will be exerted on the hot water. The bottom of hot water chamber is perforated so that the hot water under the impetus of the air pressure will pass through into the brewing chamber. A perforated plate member connected to the bottom of the hot water chamber covers the ground coffee and exerts light pressure thereon, to prevent it from swirling up during brewing. The bottom of the brewing chamber is also perforated to allow the brewed coffee to pass through to a collection receptacle. A flange member extends outwardly from the brewing chamber near the top and provides a support member on which the coffee pot may be supported on top of an ordinary drinking cup or other container, so that the brewed coffee can be collected directly therein.

In accordance with the present invention the combination pump-cover member may instead of being semi-spherical in shape or be shaped like a lemon to facilitate grasping it in the hand when pumping.

The invention will appear more clearly from the following detailed description when take in conjunction with the accompanying drawing showing, by way of example, the preferred embodiment of the inventive concept.

In the drawing:
FIGURE 1 is a side elevational view of a coffee maker constructed in accordance with the principles of the present invention, the coffee maker being shown supported on top of an ordinary drinking cup.

FIGURE 2 is a sectional view of the coffee maker taken along line 2—2 of FIGURE 1, and FIGURE 3 shows in section a coffee maker having another form of combination pump-cover member supported on top of the hot water chamber.

Throughout the specification like reference numerals indicate like parts.

The coffee maker shown in FIGURES 1 and 2 comprises a pot 10 having a cylindrically-shaped brewing chamber 11 which is adapted to hold a quantity of ground coffee 12. A separate hot water chamber 13 is supported on top of and extends partly down inside of brewing chamber 11.

In use the brewing chamber 11 and hot water chamber 13 may be fastened together by any suitable fastening means 14. A plate member 16 is used to hold the ground coffee 12 in a compact mass during brewing and thereby prevents swirling up of the grounds. The plate member 16 is rigidly fastened by soldering or other means to a spring member 17 which, in turn, is rigidly fastened to the bottom 18 of hot water chamber 13. It is thus apparent that the plate member 16 will exert a constant downward pressure on ground coffee 12 to hold it in a compact mass irrespective of the quantity used.

A hollow, resilient (preferably rubber) semi-spherical combination pump-cover member 19 is removably connected to the top of hot water chamber 13 and provides the means whereby an air pressure may be exerted on the hot water to force it through the brewing chamber 11. The top of hot water chamber 13 has an inturned section 20 which engages in an annular groove 21 contained in the bottom of pump-cover member 19 to hold it securely in place in use. To remove or insert the combination pump-cover member 19 in the hot water chamber 13, the pump member is squeezed inwardly in the region of the annular groove 21 and is then slipped through the open top of the hot water chamber. When pressure is relaxed, the pump member expands and the annular groove engages the top of the hot water chamber as previously described. The pump-cover member has two valves 22 and 23. Valve 22 at the top of the pump-cover member admits air from the atmosphere to fill the pump. Valve 23 at the bottom of the pump-cover member pneumatically connects the pump-cover member with the hot water chamber and operates to admit air pressure to the hot water chamber when the pump-cover member is squeezed. For this purpose, the valve 23 is connected with a flapper 38 which normally closes an opening 40 provided in the bottom 41 of the pump-cover member 19. Air compressed within the pump-cover member 19 will push the flapper 38 downwardly to open the opening 40. A knob 24 connected to valve member 22 facilitates grasping the pump-cover member 19 to squeeze it during operation of the coffee pot. Air is admitted into the interior of the pump-cover member 19 through the valve 22 when the pump-cover member 19 expands from a contracted position.

The bottom surface 18 of hot water chamber 13 is perforated with a series of holes 25 which allow the hot water to pass through into the brewing chamber 11. Plate member 16 is also perforated with a series of holes 26 and the bottom 27 of brewing chamber 11 is also perforated with a series of holes 28 through which the brewed coffee passes.

The brewing chamber 11 has an annular flange 29 at the top which extends outwardly from the side of the chamber to provide a support member on which the coffee pot 10 can be supported on top of an ordinary drinking cup 30 or other container during brewing as illustrated in FIGURE 1.

The coffee pot is adapted to brew one, two or many cups of coffee with the same facility.

In operation:

The coffee pot 10 is disassembled into its three major component parts, namely, the brewing chamber 11, hot water chamber 13 and pump-cover member 19. The brewing chamber 11 is then filled with a quantity of ground coffee 12, depending on the amount of coffee to be brewed. The hot water chamber 13 is then placed on top of brewing chamber 11 and the two chambers are then connected together by twisting one or the other to engage bayonet or interrupted screw joint 14. To aid in accomplishing the latter, the coffee pot 10 has a handle 13a rigidly secured to the side of the brewing chamber 13, the handle 13a also being used to grasp the coffee pot once hot water is placed in the hot water chamber as later described. The coffee pot 10 is then placed on top of a drinking cup 30 or other container, resting on the flange 29, as shown in the construction of FIG. 1. A quantity of hot water 37 is then poured into the hot water chamber 13. The pump-cover member 19 is then connected to the top of hot water chamber 13.

To brew coffee the combination pump-cover member 19 is squeezed or depressed a few times, the pump member deforming to the configuration shown in broken lines in FIGURE 2. This results in a quantity of air being pumped from pump-cover member 19 into hot water chamber 13. The air pressure forces flapper 38 to open to the position shown in broken lines in FIGURE 2, and air flows through hole 40 in the bottom 41 of pump-cover member 19. The air pressure forces the hot water 37 through the holes 25 at the bottom of hot water chamber 13 and into the brewing chamber 11. The water is also forced through the holes 26 in plate 16, through the ground coffee 12 and finally through the holes 28 at the bottom of brewing chamber 11 in which condition it is brewed coffee. The path of the hot water is denoted by the various downwardly directed arrows shown in FIGURE 2. After each stroke of the pump-cover member 19, it expands to its normal shape while at the same time a new supply of air enters through valve 22 until such time as it is fully filled and the pump ready for another stroke. In practice it was found that two or three strokes are sufficient to pump all the water from the hot water chamber 13 through brewing chamber 11. Actual experiments have shown that as the result of these few strokes the entire liquid coffee capable of being extracted from the coffee grounds, is transmitted to the hot water. Subsequent pumping will not produce any coffee at all.

FIGURE 3 shows a variation in the construction of pump member 71' of the coffee pot 10. Instead of being a semi-spheroid, it comprises a cover section 75 and an integral, lemon-shaped pump section 76. The shape of pump section 76 makes it particularly suited for grasping with the hand to actuate the pump when using the coffee pot 10. The pump member 71' contains valves 72' and 73' which are similar in construction and function to those previously described.

Thus, the present invention provides a coffee maker construction which makes it possible to brew in a few seconds' time, hot coffee having all the flavor and qualities of coffee brewed by other more lengthy methods and more expensive means known in the art.

While there is above disclosed but some embodiments of the coffee pot, it is possible to produce still other embodiments without departing from the inventive concept herein disclosed.

What is claimed is:

1. A coffee maker comprising, a cylindrical housing having an open top and a perforated bottom, said housing being adapted to hold ground coffee, another cylindrical housing having an open top and a perforated bottom removably connected to the top of the first-mentioned housing and being adapted to hold hot water, a perforated plate, means resiliently connecting said plate to the bottom of the second-mentioned housing, said perforated plate extending downwardly within the first-mentioned housing and being adapted to bear against ground coffee placed therein, manually operable resilient air pump-cover means connected to the top of the second-mentioned housing and pneumatically connected therewith, whereby air under pressure may be pumped into said housing and hot water forced through the ground coffee, and supporting means carried by the first-mentioned housing.

2. A coffee maker in accordance with claim 1 wherein said manually operable air pump-cover means comprises a resilient, hollow pump member removably connected to the top of the second-mentioned housing, a valve carried by the top of said pump-cover member and adapted to connect the interior of the pump-cover member to the atmosphere, and another valve carried by the bottom of said pump-cover member and adapted to connect the interior of the pump-cover member to the interior of the second-mentioned housing.

3. A coffee maker in accordance with claim 2, wherein said pump member is semi-spherical in shape.

4. A coffee maker comprising, a cylindrical housing having an open top and a perforated bottom, said housing being adapted to hold ground coffee, another cylindrical housing having an open top and a perforated bottom removably connected to the top of the first-mentioned housing and being adapted to hold hot water, a spring connected at one end to the bottom of the second-mentioned housing and extending downwardly within the first-mentioned housing, a perforated plate rigidly connected to the other end of said spring and adapted to bear against ground coffee in the first-mentioned housing, a resilient, hollow pump-cover member removably connected to the top of the second-mentioned housing, a valve carried by the top of said pump-cover member and adapted to connect the interior of the pump-cover member to the atmosphere, and another valve carried by the bottom of said pump-cover member and adapted to connect the interior of the pump-cover member to the interior of the second-mentioned housing, and support means carried by the first-mentioned housing.

5. A coffee maker in accordance with claim 4 wherein said support means comprises an annular flange carried by the first-mentioned housing a distance below the top.

6. A coffee maker in accordance with claim 1 wherein said air pump-cover means comprises a resilient cover removably connected to the top of said housing, a resilient lemon-shaped pump chamber integral with said cover and extending to one side thereof the interior of said pump chamber being in communication with the central opening in said cover, a valve carried at one end of said pump chamber and adapted to connect the interior of the pump chamber to the atmosphere, and another valve carried centrally in said cover and adapted to connect the interior of the pump chamber to the interior of said housing, said pump chamber being elastically deformable, whereby the first-mentioned valve closes, the second-mentioned valve opens and air under pressure is pumped from said pump chamber.

References Cited in the file of this patent

UNITED STATES PATENTS

| 51,741 | Nason | Dec. 26, 1865 |
| 2,846,939 | Ponsa | Aug. 12, 1958 |

FOREIGN PATENTS

| 674,075 | France | Oct. 15, 1925 |
| 1,037,056 | France | Apr. 29, 1953 |